United States Patent
Golan

Patent Number: 5,503,510
Date of Patent: Apr. 2, 1996

[54] BLIND RIVET

[75] Inventor: Yaakov Golan, Kibbutz Or Haner, Israel

[73] Assignee: Ornit Blind Rivets, Mobile Post Ashkelon, Israel

[21] Appl. No.: 294,745

[22] Filed: Aug. 23, 1994

[30] Foreign Application Priority Data

Aug. 27, 1993 [IL] Israel ..................... 106817

[51] Int. Cl.⁶ ............... F16B 13/04; F16B 13/06
[52] U.S. Cl. ............................... 411/43; 411/70
[58] Field of Search ................... 411/34, 36, 37, 411/38, 43, 69, 70

[56] References Cited

U.S. PATENT DOCUMENTS

| | | |
|---|---|---|
| Re. 20,055 | 8/1936 | Huck. |
| 2,030,167 | 2/1936 | Miller. |
| 2,030,168 | 2/1936 | Miller. |
| 2,030,169 | 2/1936 | Huck. |
| 2,061,628 | 11/1936 | Huck. |
| 3,149,530 | 9/1964 | Kolec. |
| 3,286,580 | 11/1966 | Jeal. |
| 3,414,965 | 12/1968 | Stau et al.. |
| 3,515,028 | 6/1970 | Patton. |
| 4,189,977 | 2/1980 | Hintz et al.. |
| 4,222,304 | 9/1980 | Yoshida et al.. |
| 4,309,137 | 1/1982 | Tanaka et al. ............ 411/70 X |
| 4,639,174 | 1/1987 | Denham et al.. |
| 4,969,785 | 11/1990 | Wright .................... 411/43 |
| 5,286,151 | 2/1994 | Eshraghi .................. 411/43 |

FOREIGN PATENT DOCUMENTS

| | | |
|---|---|---|
| 1262601 | 4/1961 | France .................... 411/43 |
| 2625023 | 12/1976 | Germany. |
| 1495592 | 1/1975 | United Kingdom. |
| 2157788 | 10/1985 | United Kingdom ........ 411/43 |

Primary Examiner—Neill R. Wilson
Attorney, Agent, or Firm—Ladas & Parry

[57] ABSTRACT

A blind rivet includes a tubular shell formed with an enlarged head and a shank, and a mandrel formed with a stem and an enlarged head. The shell and mandrel are insertable from one side of a plurality of members to be fastened together through aligned openings such that a pull force applied to the mandrel from that side causes the shell shank to bulge outwardly, and thereby to securely fasten the members between the shell head and the bulged portion of the shell shank. The mandrel includes two gripping portions axially spaced from the mandrel head and each other by bridging portions of smaller diameter than the gripping portions such that the shank is firmly gripped by the outer surfaces of the two gripping portions when the mandrel is pulled to outwardly bulge the shell shank.

24 Claims, 2 Drawing Sheets

BLIND RIVET

FIELD AND BACKGROUND OF THE INVENTION

The present invention relates to fastening devices for fastening a plurality of members together, and particularly to a blind rivet which enables a plurality of members to be fastened together where access is available only from one side of the members.

The conventional blind rivet comprises a tubular shell formed with an enlarged head at one end and a shank at its opposite end, and a mandrel formed with a stem at one end and an enlarged head at its opposite end. The shell and mandrel are insertable from one side of a plurality of members to be fastened together through aligned openings in the members, with the shell head engaging the one side of the members and with the mandrel head engaging the end of the shell shank at the opposite side of the members. The construction is such that a pull force applied to the mandrel from the one side of the members in the direction to axially compress the shell shank by the mandrel head, causes the shell shank to bulge outwardly, and thereby to securely fasten the plurality of members between the shell head and the bulged portion of the shell shank. Examples of such known blind rivet constructions are described in U.S. Pat. Nos. 2,030,167, 2,030,168, 2,030,169, 2,061,628, 3,149,530, 3,286,580, 3,414,965, 3,515,028, 4,189,977, 4,222,304 and 4,639,174.

An object of the present invention is to provide a blind rivet of the foregoing type having an improved gripping action between the mandrel and the shell. Another object of the invention is to provide a blind rivet of a relatively simple construction which can be produced in volume and at low cost.

OBJECTS AND BRIEF SUMMARY OF THE INVENTION

According to the present invention, there is provided a blind rivet of the construction described above, characterized in that the mandrel includes a first gripping portion axially spaced from the mandrel head by a first bridging portion; and a second gripping portion axially spaced from the first gripping portion by a second bridging portion; the outer diameters of the first and second bridging portions being smaller than the outer diameters of the first and second gripping portions such that the shank is firmly gripped by the outer surfaces of the two gripping portions axially spaced from each other by the second bridging portion when the mandrel is pulled to axially compress the shell shank.

Such a blind rivet thus produces a double gripping action between the mandrel and the shell, which more securely fixes the mandrel to the shell.

According to further features in the described preferred embodiment, the outer diameter of the first and second gripping portions are substantially the same as the inner diameter of the shell shank. In addition, the shell is formed with a juncture portion between its enlarged head and shank, the juncture portion having an inner diameter smaller than the outer diameter of the gripping portion and located with respect thereto that, when the mandrel is pulled to axially compress the shell shank and to bulge it outwardly, the second gripping portion is forcefully moved axially into the juncture portion and to be firmly gripped thereby.

According to further features in the described preferred embodiment, the inner surface of the mandrel head is inwardly dished such that, when the mandrel is pulled to axially compress the shell shank and to bulge it outwardly, the end of the shank is forcefully deformed radially inwardly into firm contact with the first bridging portion by the mandrel head.

According to yet additional features in the described preferred embodiment, the mandrel further includes a stem having a break-point connection to the second gripping portion to be broken away after the mandrel is pulled to axially compress the shell shank and to bulge it outwardly. More particularly, the break-point connection is located such that the end of the second gripping portion is recessed within the shank head when the stem has been broken away from the remainder of the mandrel.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
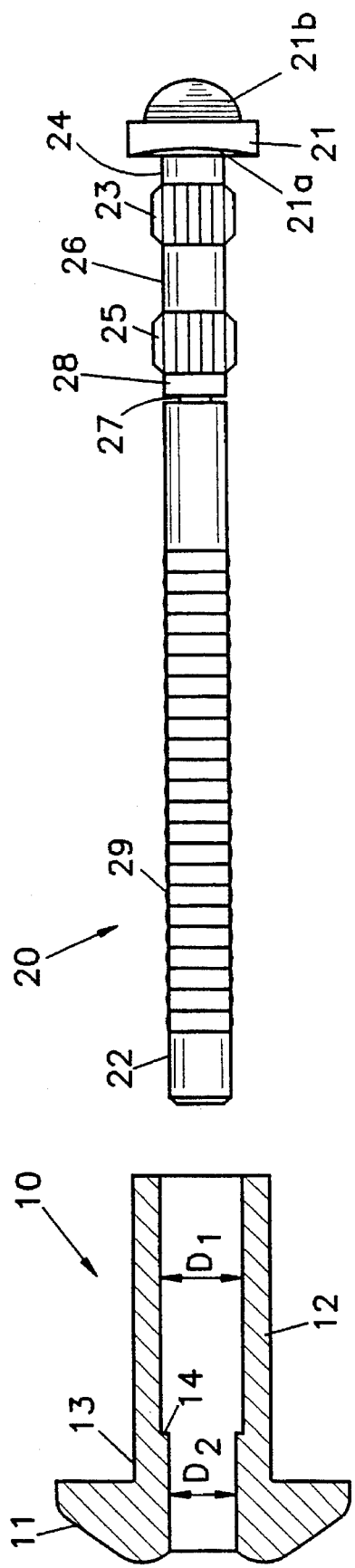
FIG. 1 is an exploded view illustrating the two main components of a blind rivet constructed in accordance with the present invention.

The blind rivet illustrated in the drawings includes two main components, namely a tubular shell, generally designated 10, sometimes referred to as a tubular rivet, or as the female member of a blind rivet; and a mandrel, generally designated 20, sometimes referred to as a pin, or as the male member of a blind rivet.

The tubular shell 10 is formed with an enlarged head 11 at one end, an elongated shank 12 at its opposite end, and a juncture portion 13 joining the shank to the head. The tubular shell 10 has a relatively large inner diameter $D_1$ through its shank 12. The diameter is reduced to $D_2$ through its juncture 13 and head 11, to define an annular shoulder 14 at the juncture portion 13.

The mandrel 20 is of solid construction. It is formed with an enlarged head 21 at one end and with an elongated stem 22 at the opposite end. The inner surface of head 21 is inwardly dished, as shown at 21a, whereas the outer surface is of semi-spherical shape as shown at 21b.

At the end formed with the head 21, the mandrel includes a first gripping portion 23 axially spaced from the head 21 by a first bridging portion 24, and a second gripping portion 25 axially spaced from the first gripping portion 23 by a second bridging portion 26. Both gripping portions 23 and 25 are of the same diameter, substantially equal to or slightly less than the inner diameter $D_1$ of the shell shank 12, but greater than the inner diameter $D_2$ of the shell juncture portion 13 and shell head 11. The outer surfaces of gripping portions 23 and 25 are formed with gripping ribs which extend axially of the respective gripping portions and are circumferentially spaced from each other.

Mandrel 20 is further formed with a deep annular groove 27 spaced from gripping portion 25 by a further bridging portion 28. The bridging portions 24, 26 and 28 all have substantially the same outer diameter, which is less than the outer diameter of the two gripping portions 23 and 25 as indicated earlier. The outer surface of stem 22 is formed with a plurality of circumferentially-extending, axially spaced ribs 29 to facilitate gripping of the stem by a pulling implement at the time the rivet is applied.

Figure 2:
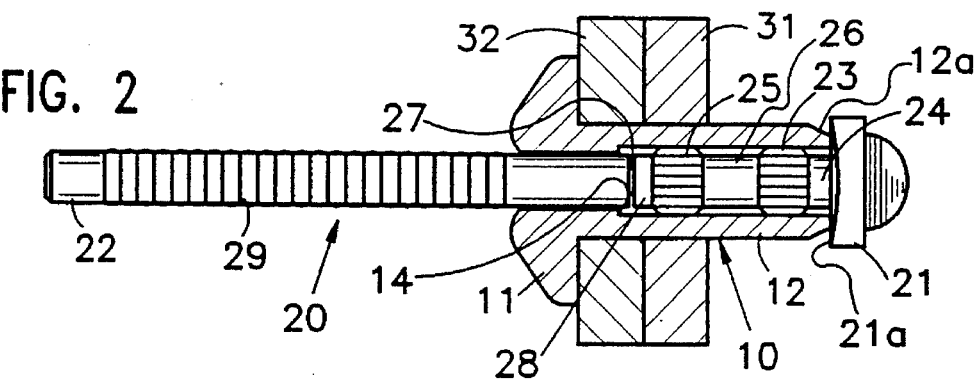
FIGS. 2, 3 and 4 illustrate the various stages in the application of the blind rivet of FIG. 1 to fasten a plurality of members together.
Figure 3:
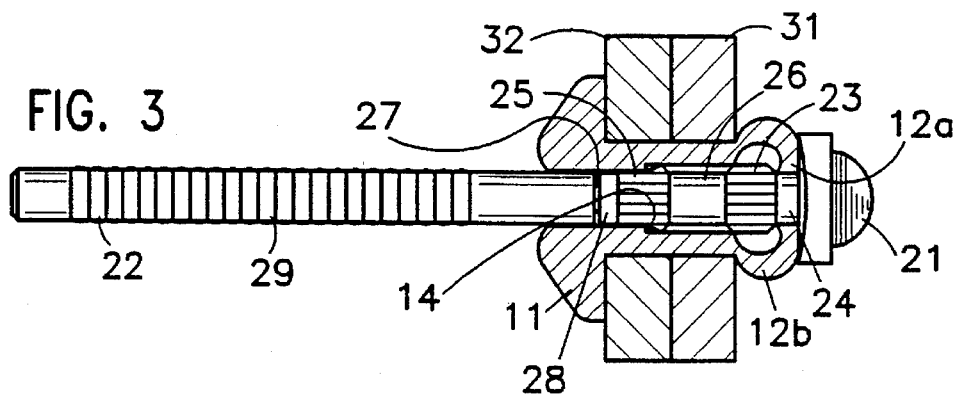
Figure 4:
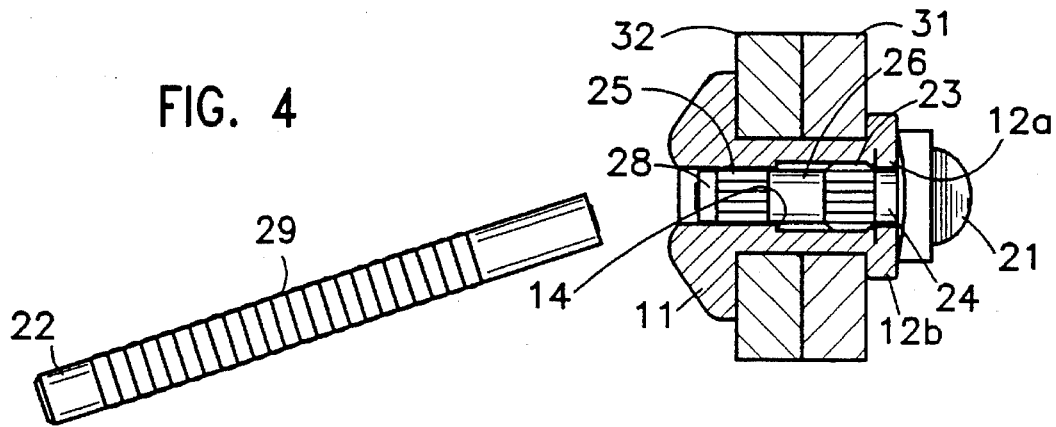

FIGS. 2–4 illustrate the manner of applying the rivet illustrated in FIG. 1 to fasten together a pair of superimposed members 31, 32, each having aligned holes for receiving the blind rivet. In this particular case, the two members 31, 32 to be fastened together are accessible only from the member 32 side.

For applying the blind rivet to the two members 31, 32, the rivet assembly, including the mandrel 20 received within the shell 10 as illustrated in FIG. 2, is passed from the member 32 side through the aligned openings in the two members, such that the shell head 11 engages the outer surface of member 32, and the mandrel head 21 projects outwardly of member 31. At this time the outer end of the shell shank 12 is engaged by the inwardly-dished surface 21a of the mandrel head 21; also the second gripping portion 25 of the mandrel is spaced from the annular shoulder 14 between the inner diameter $D_1$ (FIG. 1) of the shank and the inner diameter $D_2$ of the juncture portion 13 and head 11 of the shell 10.

A tool having four jaws (not shown) is then applied to the end of shank 12 of the shell 10, adjacent head 21 of the mandrel 20, to deform, or pinch, the end of the shank inwardly, as shown at 12a.

The ribbed portion 29 of the mandrel stem 22 is then gripped by a force-applying implement, which applies a pull force axially (leftwardly in FIG. 2) to the mandrel such that the mandrel head 21 tends to compress the shell shank 12. The inwardly-dished surface 21a of head 21 causes the end 12a of the shank to further deform inwardly into firm contact with bridging portion 24 of the mandrel. A further pulling force causes the adjacent portion of the shell shank to deform outwardly to produce an outward bulge shown at 12b between the mandrel head 21 and the outer surface of member 31 to be fastened.

During this deformation of the shank 12, the outer gripping portion 23 of the mandrel moves forcefully into the portion of the shank received within the opening in member 31, while the inner gripping portion 25 of the mandrel forcefully moves into the smaller inner diameter $D_2$ of the juncture portion 13 and head 11 of the shell 10, as also shown in FIG. 3.

The pulling force applied to the mandrel stem 22 is continued until the shell is deformed to the condition illustrated in FIG. 4. In this condition, the end portion 12a of the shank has been deformed to firmly contact the bridging portion 24 of the mandrel; the bulge portion 12b of the shell has been firmly clamped between the mandrel head 21 and member 31; the gripping portion 23 of the mandrel has moved into the space of the shell received within the opening formed in member 31; and the gripping portion 25 of the mandrel has firmly entered the small-diameter section $D_2$ of the juncture portion 13 and head 11 of the shell in the portion of the shell engaging the fastened member 32.

At this point, the stem 22 is broken away from the remainder of the mandrel via the break-point connection 27, such that the end of the mandrel remaining in the shell is recessed within the shank head 11.

The illustrated rivet is thus securely fixed to the two fastened members 31, 32, and the remaining portion of the mandrel 20 is securely fixed to the shell 10 by the two gripping surfaces 23, 25, and by the inwardly-deformed end 12a of the shank which is firmly pressed into contact with the bridging portion 24 of the mandrel, as described earlier. The illustrated blind rivet thus produces a fastening between the two members 31, 32 which has high vibration-resistance, high tensile and shear strength, and high water resistance.

As one example, both the mandrel and shell may be made of steel, preferably provided with a zinc plating to enhance its corrosion resistance.

While the invention has been described with respect to one preferred embodiment, it will be appreciated that this is set forth merely for purposes of example, and that many other variations, modifications and applications of the invention may be made.

What is claimed is:

1. A blind rivet, comprising:

a tubular shell formed with an enlarged head at one end and a shank at its opposite end;

and a mandrel formed with a stem at one end and an enlarged head at its opposite end;

said shell and mandrel being insertable from one side of a plurality of members to be fastened together through aligned openings in said members, with the shell head engaging said one side of the members and with the mandrel head engaging the end of the shell shank at the opposite side of the members, such that a pull force applied to said mandrel from said one side of the members in the direction to axially compress the shell shank by the mandrel head, causes the shell shank to bulge outwardly, and thereby to securely fasten the plurality of members between the shell head and the bulged portion of the shell shank;

characterized in that said mandrel includes:

a first gripping portion axially spaced from the mandrel head by a first bridging portion;

and a second gripping portion axially spaced from the first gripping portion by a second bridging portion;

the outer diameters of said first and second bridging portions being smaller than the outer diameters of said first and second gripping portions such that the shank is firmly gripped by the outer surfaces of the two gripping portions axially spaced from each other by said second bridging portion when the mandrel is pulled to axially compress the shell shank;

and further characterized in that said shell is formed with a juncture portion between its enlarged head and shank, said juncture portion having an inner diameter smaller than the outer diameter of said gripping portion and located with respect thereto such that, when the mandrel is pulled to axially compress the shell shank and to bulge it outwardly, the second gripping portion is forcefully moved axially into said juncture portion and is firmly gripped thereby.

2. The blind rivet according to claim 1, wherein the outer diameters of said first and second gripping portions are substantially the same as or slightly smaller than the inner diameter of said shell shank.

3. The blind rivet according to claim 1 and wherein the end of the shell shank engaging the mandrel head is deformed inwardly.

4. A blind rivet, comprising:

a tubular shell formed with an enlarged head at one end and a shank at its opposite end;

and a mandrel formed with a stem at one end and an enlarged head at its opposite end;

said shell and mandrel being insertable from one side of a plurality of members to be fastened together through aligned openings in said members, with the shell head engaging said one side of the members and with the mandrel head engaging the end of the shell shank at the opposite side of the members, such that a pull force applied to said mandrel from said one side of the members in the direction to axially compress the shell shank by the mandrel head, causes the shell shank to bulge outwardly, and thereby to securely fasten the plurality of members between the shell head and the bulged portion of the shell shank;

characterized in that said mandrel includes:

a first gripping portion axially spaced from the mandrel head by a first bridging portion;

and a second gripping portion axially spaced from the first gripping portion by a second bridging portion;

the outer diameters of said first and second bridging portions being smaller than the outer diameters of said first and second gripping portions such that the shank is firmly gripped by the outer surfaces of the two gripping portions axially spaced from each other by said second bridging portion when the mandrel is pulled to axially compress the shell shank; and wherein the inner surface of said mandrel head is inwardly dished such that, when the mandrel is pulled to axially compress the shell shank and to bulge it outwardly, the end of the shank is forcefully deformed radially inwardly into firm contact with said first bridging portion.

5. The blind rivet according to claim 4 and wherein the end of the shell shank engaging the mandrel head is deformed inwardly.

6. The blind rivet according to claim 1, wherein the outer surfaces of both of said gripping portions are formed with gripping ribs.

7. A blind rivet, comprising:

a tubular shell formed with an enlarged head at one end and a shank at its opposite end;

and a mandrel formed with a stem at one end and an enlarged head at its opposite end;

said shell and mandrel being insertable from one side of a plurality of members to be fastened together through aligned openings in said members, with the shell head engaging said one side of the members and with the mandrel head engaging the end of the shell shank at the opposite side of the members, such that a pull force applied to said mandrel from said one side of the members in the direction to axially compress the shell shank by the mandrel head, causes the shell shank to bulge outwardly, and thereby to securely fasten the plurality of members between the shell head and the bulged portion of the shell shank;

characterized in that said mandrel includes:

a first gripping portion axially spaced from the mandrel head by a first bridging portion;

and a second gripping portion axially spaced from the first gripping portion by a second bridging portion;

the outer diameters of said first and second bridging portions being smaller than the outer diameters of said first and second gripping portions such that the shank is firmly gripped by the outer surfaces of the two gripping portions axially spaced from each other by said second bridging portion when the mandrel is pulled to axially compress the shell shank; and wherein the outer surfaces of both of said gripping portions are formed with gripping ribs, said gripping ribs in said first and second gripping portions extending axially of their respective gripping positions and circumferentially spaced from each other.

8. The blind rivet according to claim 7 and wherein the end of the shell shank engaging the mandrel head is deformed inwardly.

9. The blind rivet according to claim 1, wherein said mandrel further includes a stem having a break-point connection to said second gripping portion to be broken away after the mandrel is pulled to axially compress the shell shank and to bulge it outwardly.

10. The blind rivet according to claim 9, wherein said break-point connection is located such that the end of said second gripping portion is recessed within said shank head when the stem has been broken away from the remainder of the mandrel.

11. The blind rivet according to claim 9, wherein said stem is formed with circumferentially-extending, axially-spaced gripping ribs.

12. The blind rivet according to claim 1, wherein said first and second bridging portions are of substantially the same outer diameters.

13. A blind rivet, comprising:

a tubular shell formed with an enlarged head at one end and a shank at its opposite end;

and a mandrel formed with a stem at one end and an enlarged head at its opposite end;

said shell and mandrel being insertable from one side of a plurality of members to be fastened together through aligned openings in said members, with the shell head engaging said one side of the members and with the mandrel head engaging the end of the shell shank at the opposite side of the members;

said mandrel including:

a first gripping portion formed with gripping ribs and axially spaced from the mandrel head by a first bridging portion;

and a second gripping portion formed with gripping ribs and axially spaced from the first gripping portion by a second bridging portion;

the outer diameters of said first and second bridging portions being smaller than the outer diameters of said first and second gripping portions such that the shank is firmly gripped by the outer surfaces of the two gripping portions axially spaced from each other by said second bridging portion when the mandrel is pulled to axially compress the shell shank; and wherein the outer diameters of said first and second gripping portions are approximately the same as the inner diameter of the shell shank.

14. The blind rivet according to claim 13 and wherein the end of the shell shank engaging the mandrel head is deformed inwardly.

15. A blind rivet, comprising:

a tubular shell formed with an enlarged head at one end and a shank at its opposite end;

and a mandrel formed with a stem at one end and an enlarged head at its opposite end;

said shell and mandrel being insertable from one side of a plurality of members to be fastened together through aligned openings in said members, with the shell head engaging said one side of the members and with the mandrel head engaging the end of the shell shank at the opposite side of the members;

said mandrel including:

a first gripping portion formed with gripping ribs and axially spaced from the mandrel head by a first bridging portion;

and a second gripping portion formed with gripping ribs and axially spaced from the first gripping portion by a second bridging portion;

the outer diameters of said first and second bridging portions being smaller than the outer diameters of said first and second gripping portions such that the shank is firmly gripped by the outer surfaces of the two gripping portions axially spaced from each other by said second bridging portion when the mandrel is pulled to axially compress the shell shank; and wherein said shell is formed with a juncture portion between its enlarged head and shank, said juncture portion having an inner diameter smaller than the outer diameter of said gripping portion and located with respect thereto such that, when the mandrel is pulled to axially compress the shell shank and to bulge it outwardly, the second gripping portion is forcefully moved axially into said juncture portion and is firmly gripped thereby.

16. The blind rivet according to claim 15 and wherein the end of the shell shank engaging the mandrel head is deformed inwardly.

17. A blind rivet, comprising:

tubular shell formed with an enlarged head at one end and a shank at its opposite end;

and a mandrel formed with a stem at one end and an enlarged head at its opposite end;

said shell and mandrel being insertable from one side of a plurality of members to be fastened together through aligned openings in said members, with the shell head engaging said one side of the members and with the mandrel head engaging the end of the shell shank at the opposite side of the members;

said mandrel including:

a first gripping portion formed with gripping ribs and axially spaced from the mandrel head by a first bridging portion;

and a second gripping portion formed with gripping ribs and axially spaced from the first gripping portion by a second bridging portion;

the outer diameters of said first and second bridging portions being smaller than the outer diameters of said first and second gripping portions such that the shank is firmly gripped by the outer surfaces of the two gripping portions axially spaced from each other by said second bridging portion when the mandrel is pulled to axially compress the shell shank;

wherein the outer diameters of said first and second gripping portions are approximately the same as the inner diameter of the shell shank; and wherein the inner surface of said mandrel head is inwardly dished such that, when the mandrel is pulled to axially compress the shell shank and to bulge it outwardly, the end of the shank is forcefully deformed radially inwardly into firm contact with said first bridging portion.

18. The blind rivet according to claim 17 and wherein the end of the shell shank engaging the mandrel head is deformed inwardly.

19. A blind rivet, comprising:

a tubular shell formed with an enlarged head at one end and a shank at its opposite end;

and a mandrel formed with a stem at one end and an enlarged head at its opposite end;

said shell and mandrel being insertable from one side of a plurality of members to be fastened together through aligned openings in said members, with the shell head engaging said one side of the members and with the mandrel head engaging the end of the shell shank at the opposite side of the members;

said mandrel including:

a first gripping portion formed with gripping ribs and axially spaced from the mandrel head by a first bridging portion;

and a second gripping portion formed with gripping ribs and axially spaced from the first gripping portion by a second bridging portion;

the outer diameters of said first and second bridging portions being smaller than the outer diameters of said first and second gripping portions such that the shank is firmly gripped by the outer surfaces of the two gripping portions axially spaced from each other by said second bridging portion when the mandrel is pulled to axially compress the shell shank; and wherein said gripping ribs in said first and second gripping portions extend axially of their respective gripping portions and are circumferentially spaced from each other.

20. The blind rivet according to claim 19 and wherein the end of the shell shank engaging the mandrel head is deformed inwardly.

21. A blind rivet, comprising:

a tubular shell formed with an enlarged head at one end and a shank at its opposite end;

and a mandrel formed with a stem at one end and an enlarged head at its opposite end;

said shell and mandrel being insertable from one side of a plurality of members to be fastened together through aligned openings in said members, with the shell head engaging said one side of the members and with the mandrel head engaging the end of the shell shank at the opposite side of the members;

said mandrel including:

a first gripping portion axially spaced from the mandrel head by a first bridging portion;

a second gripping portion axially spaced from the first gripping portion by a second bridging portion;

the outer diameters of said first and second bridging portions being smaller than the outer diameters of said first and second gripping portions such that the shank is firmly gripped by the outer surfaces of the two gripping portions axially spaced from each other by said second bridging portion when the mandrel is pulled to axially compress the shell shank;

a stem having a break-point connection to said second gripping portion to be broken away after the mandrel is pulled to axially compress the shell shank and to bulge it outwardly;

wherein said break-point connection is located such that the end of said second gripping portion is recessed within said shank head when the stem has been broken away from the remainder of the mandrel.

22. The blind rivet according to claim 21, wherein said stem is formed with circumferentially-extending, axially-spaced gripping ribs.

23. The blind rivet according to claim 21, wherein said first and second bridging portions are of substantially the same outer diameters.

24. The blind rivet according to claim 21 and wherein the end of the shell shank engaging the mandrel head is deformed inwardly.

* * * * *